(12) United States Patent
Dalla Betta et al.

(10) Patent No.: US 8,549,908 B2
(45) Date of Patent: Oct. 8, 2013

(54) THERMAL ANEMOMETER FLOW METER FOR THE MEASUREMENT OF WET GAS FLOW

(75) Inventors: Ralph A. Dalla Betta, Saratoga, CA (US); Daniel R. Kurz, Salinas, CA (US); Bruce B. Burton, Royal Oaks, CA (US); Ricardo Martinez, Santa Cruz, CA (US); Jerome L. Kurz, Carmel Valley, CA (US)

(73) Assignee: Los Robles Advertising, Inc., Monterey, CA (US)

( * ) Notice: Subject to any disclaimer, the term of this patent is extended or adjusted under 35 U.S.C. 154(b) by 234 days.

(21) Appl. No.: 12/817,211

(22) Filed: Jun. 17, 2010

(65) Prior Publication Data

US 2011/0308311 A1    Dec. 22, 2011

(51) Int. Cl.
*G01F 13/00* (2006.01)
*G01P 5/00* (2006.01)

(52) U.S. Cl.
USPC ...................................... 73/202.5; 73/170.12

(58) Field of Classification Search
None
See application file for complete search history.

(56) References Cited

U.S. PATENT DOCUMENTS

| | | | |
|---|---|---|---|
| 3,481,196 A | 12/1969 | Rodely | |
| 4,048,854 A * | 9/1977 | Herzl | 73/861.02 |
| 4,418,568 A * | 12/1983 | Surman | 73/202.5 |
| 4,449,401 A * | 5/1984 | Kaiser et al. | 73/202.5 |
| 4,487,062 A * | 12/1984 | Olin et al. | 73/202.5 |
| 4,884,441 A * | 12/1989 | Lew | 73/195 |
| 4,914,947 A * | 4/1990 | Davidson | 73/202.5 |
| 5,007,293 A * | 4/1991 | Jung | 73/861.04 |
| 5,561,245 A * | 10/1996 | Georgi et al. | 73/152.02 |
| 6,065,486 A | 5/2000 | Vetterick et al. | |
| 6,308,553 B1 * | 10/2001 | Bonne et al. | 73/1.35 |
| 6,332,356 B1 * | 12/2001 | Hecht et al. | 73/202.5 |
| 6,571,621 B2 * | 6/2003 | Watanabe et al. | 73/202.5 |

(Continued)

FOREIGN PATENT DOCUMENTS

| | | |
|---|---|---|
| EP | 1321747 A2 | 6/2003 |
| GB | 2238615 A | 6/1991 |

(Continued)

OTHER PUBLICATIONS

International Search Report and Written Opinion, 13 pages.

(Continued)

*Primary Examiner* — Harshad R Patel
(74) *Attorney, Agent, or Firm* — Patent Law Group LLP; David C Hsia

(57) ABSTRACT

A flow body flow meter includes a flow body and a sensor having one or more probes in the flow body. As a wet gas stream enters the flow body, an internal passage imparts angular momentum to the stream to induce a rotating flow. The wet gas stream at least intermittently carries liquid phase particles and the inertia of the denser liquid phase particles separates them from the rotating flow. The probes of the sensor are located in a part of the rotating flow that is free of any liquid phase particles. The internal passage may include an axial swirler and a cylindrical section downstream from the axial swirler. The axial swirler imparts the nonlinear motion to the stream, and tips of the probes are located near a center axis of the cylindrical section so they are free of any liquid phase particles.

13 Claims, 21 Drawing Sheets

(56) References Cited

U.S. PATENT DOCUMENTS

| | | | |
|---|---|---|---|
| 6,851,309 B2 * | 2/2005 | Lenzing et al. | 73/204.22 |
| 7,607,358 B2 * | 10/2009 | Atkinson et al. | 73/861.12 |
| 2002/0116995 A1 * | 8/2002 | Watanabe et al. | 73/202.5 |
| 2007/0193373 A1 * | 8/2007 | Xie et al. | 73/863.03 |
| 2009/0114038 A1 * | 5/2009 | Atkinson et al. | 73/861.63 |
| 2009/0204346 A1 * | 8/2009 | Xie | 73/861.04 |

FOREIGN PATENT DOCUMENTS

| | | | |
|---|---|---|---|
| GB | 2406386 | A | 3/2005 |
| GB | 2454256 | A | 5/2009 |
| WO | 9218834 | A1 | 10/1992 |

OTHER PUBLICATIONS

"Moisture Separator for Wet Condenser System," RheoVac®Technical Notes, 2007, 2 pages, INTEK, Inc., Westerville, OH 43082-9057.

"TLV® Separator Filter SF1," Pamphlet A3000, Mar. 2008, 4 pages, TLV. Corporation, Charlotte, NC 28273-6790.

"Spiraflo Steam Flowmeters," SB-P-330-01, 1996, 8 pages, Spirax-Sarco Limited, Cheltenham, Gloucestershire, UK.

"Rain and moisture sensor shields," Doc. No. 02MK011509, 2003, 1 page, FCI Fluid Components International LLC, San Marcos CA 92069.

* cited by examiner

# THERMAL ANEMOMETER FLOW METER FOR THE MEASUREMENT OF WET GAS FLOW

FIELD OF INVENTION

This invention relates to methods and apparatus to measure flow characteristics of a stream of gas phase particles that intermittently carries liquid phase particles.

DESCRIPTION OF RELATED ART

The measurement of gas flows containing liquid droplets or mist is known to be very difficult. For example, Steven and Hall published data showing that for an orifice plate differential pressure flow meter, a 10% liquid mass flow leads to a 20% error in gas flow measurement. See R. Steven, A. Hall, Flow Measurement and Instrumentation 20(2009) 141-151. While they show a correlation that allows the meter to be corrected to provide a reading within 2% of the actual gas flow, this requires knowing the liquid mass flow rate. Similar errors were reported by Lupeau and co-workers for a venturi differential pressure flow meter. See A. Lupeau et al., Flow Measurement and Instrumentation 18(2007)1-11. Other flow meter types have been applied to the measurement of so called wet gas, which describes a gas phase stream containing liquid phase droplets. Daniel and Lund describe a technique to measure wet gas flow rate using a venturi differential pressure type device however the design is very complicated involving multiple pressure transducers. See U.S. Pat. No. 6,898,986. An additional disadvantage of these differential pressure meters is that they have a very narrow dynamic operating range, typically 5:1 or at the most 10:1. For example, the meter sold by Solartron ISA of United Kingdom has a turndown ratio of 8:1. Many flow measurement applications have a much wider range of flow rate that must be measured. For example wet gas steam flows in building heating applications can vary by 50 or 100 to 1 from winter to summer and high load to low load. Such a meter would have to be sized for the high flow and would not have a usable signal during the low flow period.

Other technologies have been explored to measure wet gas flow. Dutton describes the use of a Coriolis type flow meter to measure both the gas flow rate and the liquid flow rate. See U.S. Pat. No. 7,231,835. The measurement technique utilizes two Coriolis meters configured to measure different parameters allowing the calculation of the target flow rates. Ultrasonic and vortex shedding type flow meters have been used to measure wet gas flow but these instruments suffer from disadvantages as well. Vortex shedding flow meters cannot measure at low flow velocities and ultrasonic meters are expensive and suffer from liquid film effects on the transducers.

Thermal anemometer type flow meters have a very wide dynamic range, 100:1 and in some cases up to 1000:1. In addition, they have good durability, good accuracy, and high repeatability, and they have long proven themselves in the measurement of dry gas flow in a variety of applications. However, thermal anemometer type flow meters are very sensitive to liquid in the gas stream since any liquid contacting the sensor probes will cause a high erroneous reading. Nonetheless, the significant advantages of a thermal anemometer type flow meter make it highly desirable to develop a thermal anemometer flow meter that could operate in wet gas flows.

BRIEF DESCRIPTION OF THE DRAWINGS

In the drawings.

Use of the same reference numbers in different figures indicates similar or identical elements.

SUMMARY

In one or more embodiments of the present disclosure, a system includes a flow body flow meter. The flow body flow meter includes a flow body and a sensor having one or more probes in the flow body. As a wet gas stream enters the flow body, an internal passage imparts angular momentum to the stream to induce a rotating flow. The wet gas stream at least intermittently carries liquid phase particles and the inertia of the denser liquid phase particles separates them from the rotating flow. The probes of the sensor are located in a part of the flow that is free of any liquid phase particles.

The internal passage may include an axial swirler and a cylindrical section downstream from the axial swirler. The axial swirler imparts the angular momentum to the stream, and the probes are located near a center axis of the cylindrical section so they are free of any liquid phase particles.

DETAILED DESCRIPTION

Figure 1:
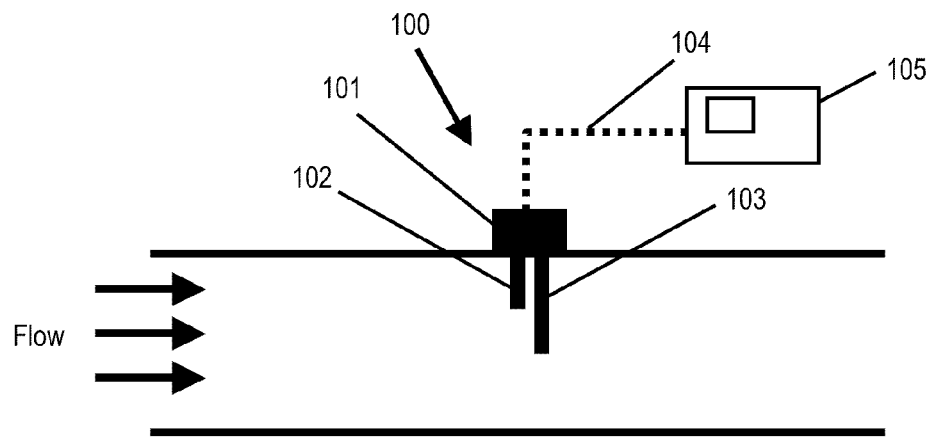
FIG. 1 illustrates a conventional thermal anemometer flow meter having two probes in a flow stream.

FIG. 1 illustrates a conventional thermal anemometer flow meter 100. Flow meter 100 includes a thermal anemometer sensor 101 having probes 102 and 103, leads 104, and an electric controller circuit 105. Probes 102 and 103 are inserted into a stream. Probe 102 measures the stream temperature while probe 103 is heated and simultaneously monitors its own temperature. Leads 104 connect probes 102 and 103 to an electrical controller circuit 105 to form a thermal anemometer flow meter. While there are several modes by which flow meter 100 can operate, in one mode electrical controller circuit 105 provides electrical power input to probe 103 to maintain its temperature at a set value above the temperature sensed by probe 102 (i.e., the stream temperature). The power required is a function of heat loss, which is proportional to the mass flow of the stream past probe 103. A variety of commercial flow instrumentation is produced and sold using this technology. Several important aspects of flow meter 100 include that it has demonstrated a very wide turndown ratio (200 to 1 is routinely possible), has good accuracy and high reproducibility over this large flow rate range, and has a high durability since there are no orifices to plug or moving parts to wear.

Figure 2:
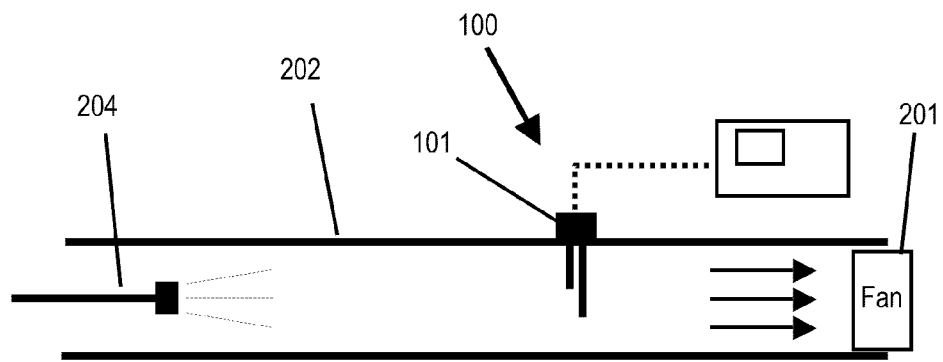
FIG. 2 illustrates the thermal anemometer flow meter of FIG. 1 applied to the measurement of a gaseous flow containing droplets of liquid.

FIG. 2 illustrates flow meter 100 applied to the measurement of a wet gas stream. Sensor 101 is installed in a four inch diameter pipe 202 connected to a fan 203 to provide an air flow over the meter. Upstream of sensor 101 is installed a water mist injector 204 that produces a fine water mist containing water droplet ranging in size from about 5 to about 100 microns in diameter. Flow meter 100 is calibrated to read air flow velocity in standard feet per minute (SFPM). Fan 203 is adjusted to provide air flow velocities of 1,000, 5,000 and 10,000 SFPM. At each velocity water mist injector 204 is turned on at a flow rate of 54 grams of liquid water per minute to produce a low mass flow of water mist in the air flow producing a wet gas stream flowing over probes 102 and 103.

Figures 3A, 3B, 3C:
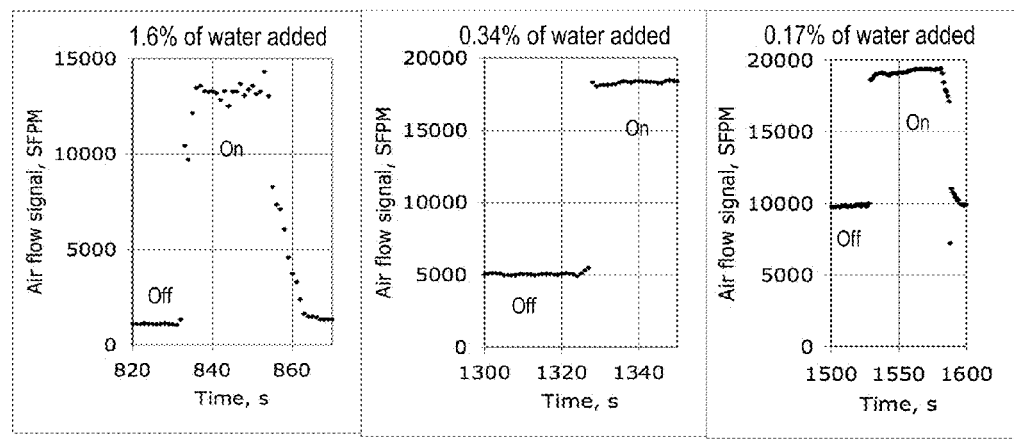
FIGS. 3A, 3B, 3C are charts showing measurement results from the thermal anemometer flow meter of FIG. 1 in the setup of FIG. 2.

FIGS. 3A, 3B, and 3C show the response of thermal anemometer flow meter 100. Even though the water mass flow fractions are very low, 1.6 to 0.17%, the effect on flow meter 100 is significant, causing the flow meter to read 14 times too high at 1,000 SFPM and to drive the flow meter signal to full scale at 5,000 and 10,000 SFPM.

The large effect of the water mist can be understood as follows. The air is at about 25° C. and probe 103 is heated about 50° C. above the temperature of the air flow stream. The amount of power applied to keep probe 103 at about 75° C. is proportional to the air flow rate. The water is essentially at the same temperature as the air at about 25° C. When the water mist is turned on, the water droplets impact probe 103 and extract heat from the probe. This causes electrical control circuit 105 to ramp up the heating current to maintain probe 103 at about 75° C. and report a very large flow velocity. For this type of flow meter to be used to measure the gas flow rate in a wet gas stream, no liquid water droplets can impact probe 103. While this type of meter has significant advantages over other types of flow measurement technology, no thermal anemometer technology has been demonstrated to measure gaseous flow rate in the presence of liquid droplets.

In one or more embodiments of the present disclosure, a flow measurement system includes a flow body flow meter with a flow body and a sensor inside the flow body. The sensor may be a thermal anemometer sensor. The system is exposed to a wet gas stream, which is a stream of gas phase particles that at least intermittently carries liquid phase particles (e.g., a mist or droplets). The flow body separates the liquid phase particles from a portion of the wet gas stream and directs that portion of the wet gas stream over probes of the sensor to allow for an accurate measurement of the gas flow rate. Throughout this specification, gas phase particles and gas phase will be used interchangeably with the use of particles to mean molecules or any gas phase species that can be measured by a gas phase flow meter.

In one or more embodiments of the present disclosure, the flow body includes a rotational path imparting angular momentum to the stream such that the inertia of the denser liquid phase particles drives them to the outside of the rotating stream by centrifugal force. As the liquid phase particles are driven to the outside of the rotating stream within the flow body, they are directed away from the sensor probes such that only the gas phase particles of the stream contact the sensor probes. The rotational path can be one or more full circles or can be a portion of a circle, for example a quarter circle where the gas phase traverses a 90 degree corner.

Figure 4A:
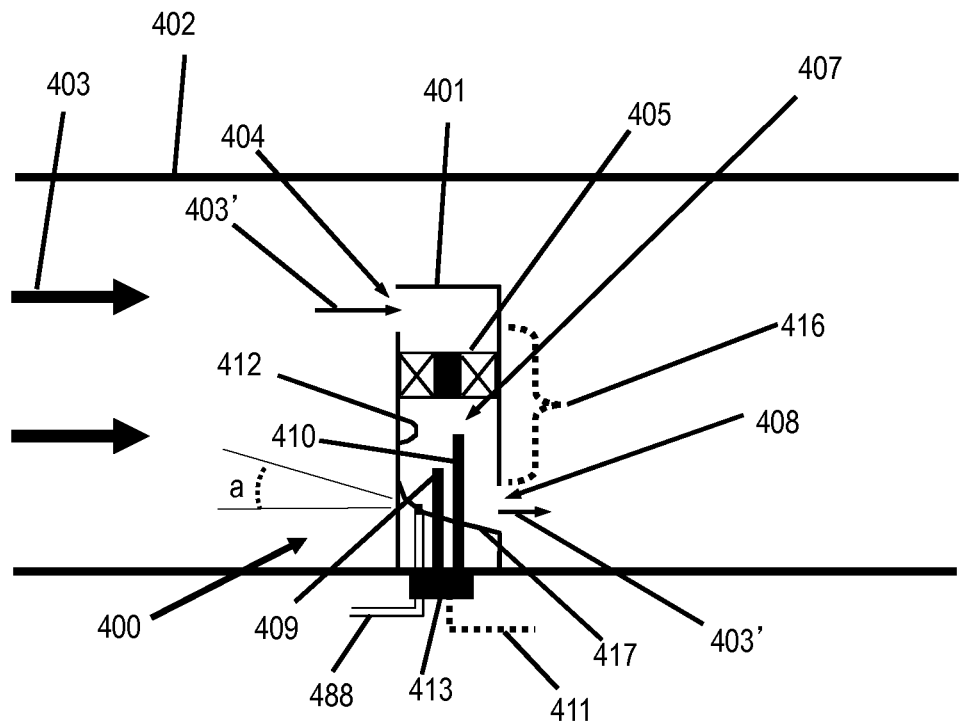
FIG. 4A illustrates a system with a flow body flow meter in one or more embodiments of the present disclosure.

FIG. 4A illustrates a system with a flow body flow meter 400 in one or more embodiments of the present disclosure. Meter 400 includes a flow body 401 and a sensor 413 in the flow body. Meter 400 measures properties of a wet gas stream 403 flowing through a pipe or duct 402. Stream 403 at least intermittently carries liquid phase particles.

Flow body 401 is mounted normal to the bottom of duct 402 so the flow body is substantially orthogonal to the flow direction. Flow body 401 is tube like with a lateral inlet 404 pointing substantially into the flow direction, an internal passage 416 downstream from the inlet, and a lateral outlet 408 downstream from the internal passage and pointing substantially away from the flow direction. Inlet 404 is located away from the duct wall and outlet 408 is located near the duct wall. Alternatively flow body 401 is mounted normal to the top of duct 402 where inlet 404 is located near the duct wall and outlet 408 is located away from the duct wall.

Internal passage 416 includes an axial swirler 405 downstream from inlet 404, and a cylindrical section 407 downstream from the axial swirler. Axial swirler 405 provides a rotational path imparting angular momentum to a portion 403' of stream 403 that enters flow body 401. Sensor 413 includes one or more probes 409 and 410. Sensor 413 is located near the outlet end of flow body 401, and probes 409 and 410 extend axially into cylindrical section 407 so they are located near the center axis of the cylindrical section and away from an interior wall 412 of the cylindrical section. Sensor 413 may be a flow sensor, such as a thermal anemometer sensor that can measure mass flow, volumetric flow, or velocity. Alternatively, sensor 413 may be a different type of sensor that measures temperature, heat capacity, density, viscosity, humidity, or other fluid properties thus allowing flow body 401 to be used to measure these properties without interference from the liquid phase particles.

Stream 403' enters inlet 404 of flow body 401. Flow body 401 turns stream 403' downward through axial swirler 405. Partitions 502 of axial swirler 405 cause steam 403' to move in a helical motion as it passes through the axial swirler. Stream 403' continues to move in a circular manner down into cylindrical section 407 before flow body 401 turns the stream sideways and out through outlet 408.

The helical motion imparts a rotational component or angular momentum to stream 403' within axial swirler 405 and in cylindrical section 407 that forces the denser liquid phase particles to the periphery of the cylindrical section away from probes 409 and 410 of sensor 413. When axial swirler 405 imparts sufficient angular momentum to stream 403' that continues into cylindrical section 407, then essentially all of the liquid phase particles are forced to interior wall 412 of the cylindrical section and probes 409 and 410 are exposed to a part of the stream 403' without liquid phase particles. The liquid phase particles will run down interior wall 412 and exit through outlet 408. The outlet end of flow body 401 may include an elbow 417 having a bottom surface forming an angle "a" to the horizontal plane to aid the exit of the liquid phase particles. It should be noted that sensing portion of probes 409 and 410 are located at their tips so that some liquid contact at the bottom of the probes as the liquid phase particles exit through outlet 408 does not have a significant effect on the sensor signal.

Figure 4B:
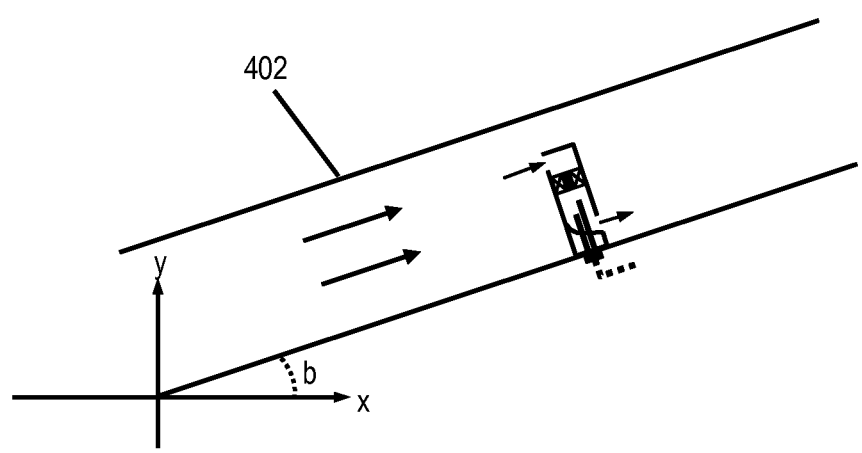
FIG. 4B illustrates the system of FIG. 4A where a duct is inclined at an angle in one or more embodiments of the present disclosure.

In one or more embodiments, duct 402 may be inclined as long as the flow velocity of stream 403' is sufficient to drive liquid phase particles out from flow body 401 so they do not collect within cylindrical section 407 and interfere with the operation of probes 409 and 410. As show in FIG. 4B, duct 402 can have an angle "b" to the horizontal plane. As angle b increases, the liquid phase flow out of flow body 401 may become restricted. When angle b exceeds angle a of elbow 417 (FIG. 4A), gravity may cause the liquid phase particles to collect in internal passage 407 (FIG. 4A). At very high flow velocity, there may be no limit on angle b since a fast gas flow through flow body 401 will drive the liquid phase flow out. Similarly, angle b can be negative, with duct 402 pointing vertically down without limitation to an angle b of −90 degrees.

Figure 5:
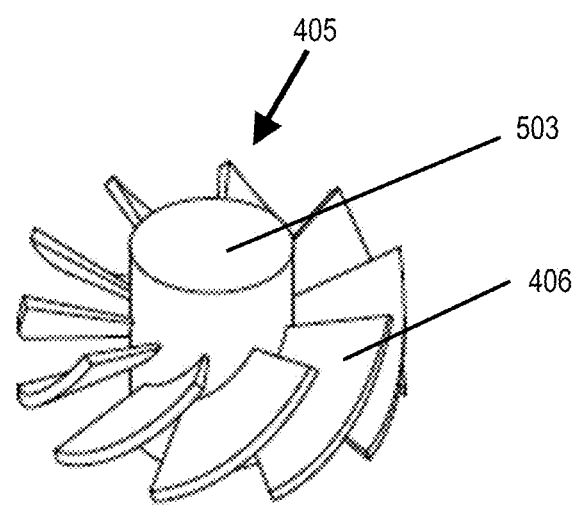
FIG. 5 illustrates an axial swirler in the flow body flow meter of FIG. 4 in one or more embodiments of the present disclosure.

FIG. 5 illustrates axial swirler 405 in flow body flow meter 400 in one or more embodiments of the present disclosure. Axial swirler 405 has partitions 502, such as angled vanes or blades, arrayed around the outside of a central hub 503. As stream 403' (FIG. 4A) flows down into the open space between partitions 502, it is forced to flow in a clockwise direction (looking down into the swirler). Thus stream 403' exiting axial swirler 405 has some downward momentum and some clockwise angular momentum. Axial swirler 405 may have different designs where the number, the length, the angle, and the shape of the vanes may be varied.

In system 400 of FIG. 4, axial swirler 405 may create a recirculation zone in the center of stream 403' just downstream of the axial swirler. This recirculation zone may disturb the flow over probes 409 and 410 and cause liquid phase particles to impact the probes. One way to reduce or eliminate such a recirculation zone is to reduce the flow area in the region downstream from axial swirler 405.

Figure 6:
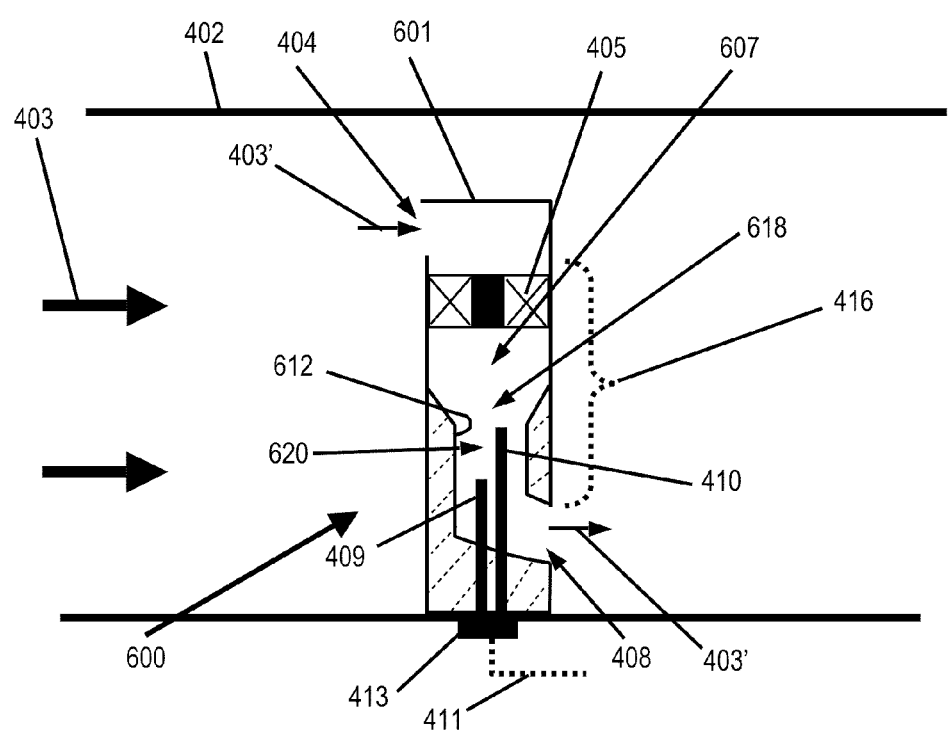
FIG. 6 illustrates a variation of the flow body flow meter of FIG. 4 with a contracting section for reducing or eliminating a recirculation zone downstream of the axial swirler in one or more embodiments of the present disclosure.

FIG. 6 illustrates a system with a flow body flow meter 600 that is a variation of meters 400 (FIG. 4) in one or more embodiments of the present disclosure. Meter 600 is similar to meter 400 but has a reduced flow area downstream from axial swirler 405. Meter 600 is mounted to duct 402 similar to meter 400.

Meter 600 includes a flow body 601 and sensor 413 in the flow body. Flow body 601 is tube like with lateral inlet 404, an internal passage 616 downstream from the inlet, and lateral outlet 408 downstream from the internal passage. Internal passage 616 includes axial swirler 405 downstream from inlet 404, a wide cylindrical section 607 downstream from the axial swirler, a narrowing section 618 downstream from the wide cylindrical section, and a narrow cylindrical section 620 downstream from the narrowing section. Narrowing section 618 reduces the flow area downstream from axial swirler 405. Narrowing section 618 may reduce the flow area by a contraction ratio (flow cross sectional area of wide cylindrical section 607 divided by flow cross sectional area of narrow cylindrical section 620) of 0.9 to 0.2, 0.8 to 0.4, or 0.7 to 0.4. Narrowing section 618 may have a conical shape. Probes 409 and 410 extend axially into narrow cylindrical section 620 so they are located near the center axis of the narrow cylindrical section and away from an interior wall 612 of the narrow cylindrical section. In addition to eliminate or reduce a recirculation zone downstream of axial swirler 405, narrow cylindrical section 620 may also increase the stream velocity and the rotational velocity to enhance the centrifugal force and thus be more effective in driving liquid phase particles to the outside of the flow path.

As similarly described above, flow body 601 may include elbow 417 and duct 402 may be inclined as long as the flow velocity of stream 403' is sufficient to drive liquid phase particles out from flow body 601 so they do not collect within narrow cylindrical section 620 and interfere with the operation of probes 409 and 410.

Figure 7:
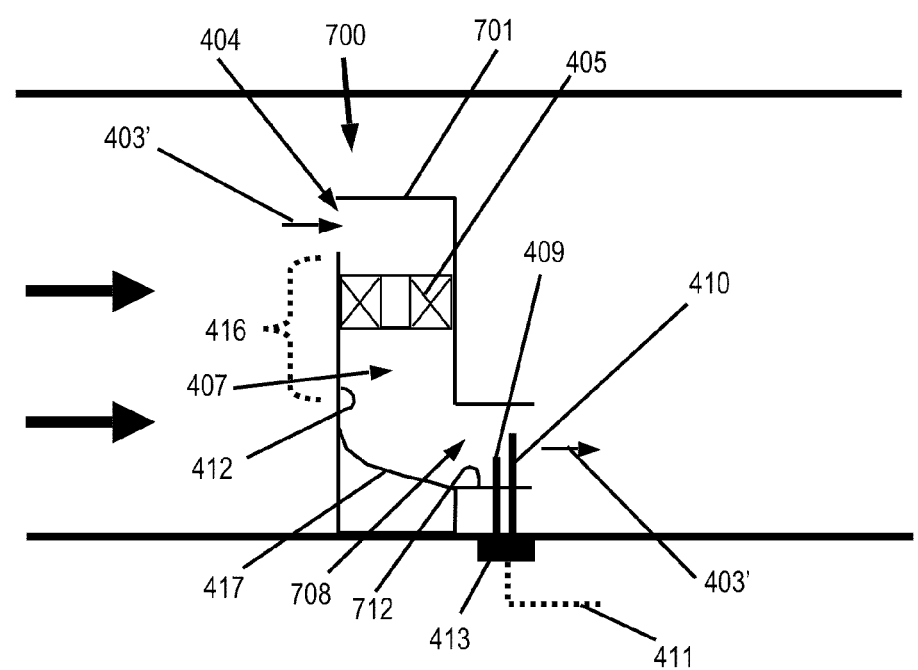
FIG. 7 illustrates a flow body flow meter that is a variation of the meter of FIG. 4 with a ducted outlet in one or more embodiments of the present disclosure.

FIG. 7 illustrates a system with a flow body flow meter 700 that is a variation of meter 400 (FIG. 4) in one or more embodiments of the present disclosure. Meter 700 is similar to meter 400 but sensor 413 is located in an outlet duct 708. Meter 700 is mounted to duct 402 similar to meter 400.

Meter 700 includes a flow body 701 and sensor 413 in the flow body. Flow body 701 is tube like with lateral inlet 404, internal passage 416 downstream from the inlet, and outlet duct 708 downstream from the internal passage. Outlet duct 708 is a horizontal duct. Sensor 413 is mounted to the bottom of outlet duct 708 where probes 409 and 410 extend vertically into the outlet duct so their tips are located near the center axis of the outlet duct and away from an interior wall 712 of the outlet duct. In meter 700, the liquid phase particles run down to the bottom of outlet duct 708 without contacting the probe tips.

As similarly described above, flow body 701 may include elbow 417 and duct 402 may be inclined as long as the flow velocity of stream 403' is sufficient to drive liquid phase particles out from flow body 701 so they do not collect within outlet duct 708 and interfere with the operation of probes 409 and 410.

Figure 8:
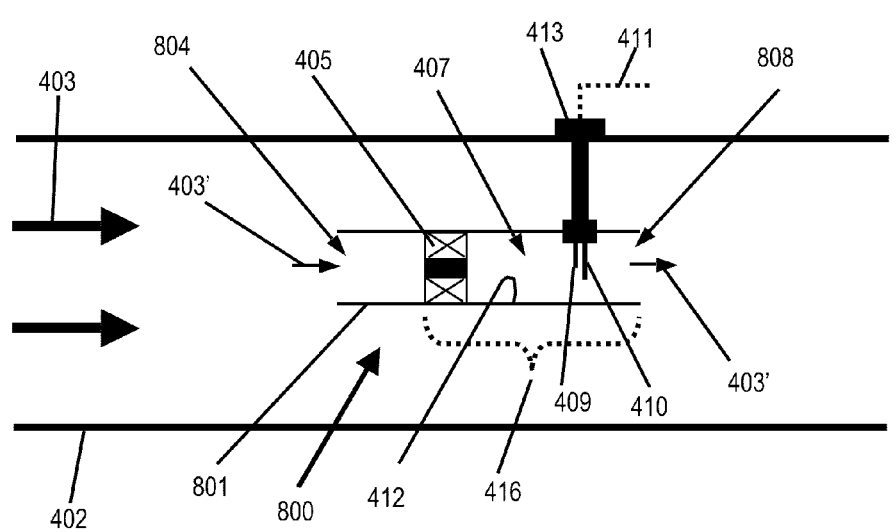
FIG. 8 illustrates a system with a flow body flow meter aligned parallel with a flow in one or more embodiments of the present disclosure.

FIG. 8 illustrates a system with a flow body flow meter 800 aligned parallel with a flow in one or more embodiments of the present disclosure. Meter 800 includes a flow body 801 and sensor 413 in the flow body. Flow body 801 is tube like with an inlet 804, internal passage 416 downstream from the inlet, and a outlet 808 downstream from the internal passage. Flow body 801 is oriented in line with the flow of stream 403 in duct 402 so that inlet 802 is pointed essentially in the flow direction and outlet 808 is pointed essentially away from the flow direction. In internal passage 416, axial swirler 405 imparts rotational component or angular momentum to stream 403'. The denser liquid phase particles in this rotating flow are driven to interior wall 412 of cylindrical section 407 and only gas phase particles contact probes 409 and 410 of sensor 413. In meter 800, sensor 413 is shown entering from the side of flow body 801 downstream of axial swirler 405. In one or more alternative embodiments, sensor 413 may enter flow body 801 from the outlet end with the outlet flow diverted to one side as shown in meters 400 and 600 in FIGS. 4 and 6.

As similarly described above, duct 402 may be inclined as long as the flow velocity of stream 403' is sufficient to drive liquid phase particles out from flow body 801 so they do not collect within internal passage 416 and interfere with the operation of probes 409 and 410.

Figure 9:
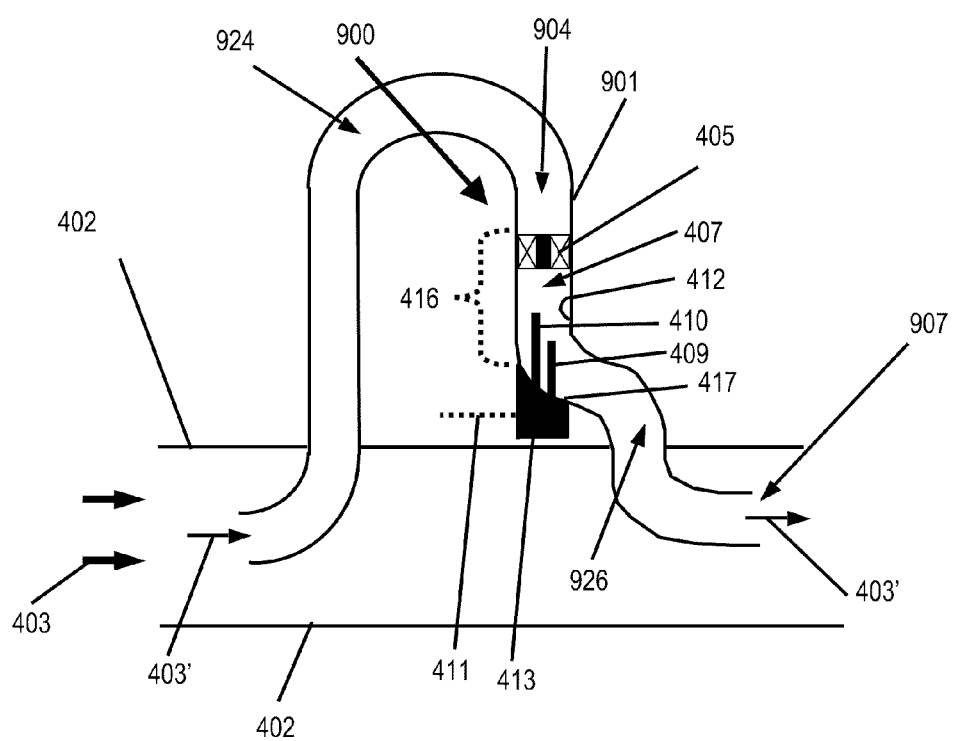
FIG. 9 illustrates a system with an external flow body flow meter located outside of a pipe in one or more embodiments of the present disclosure.

FIG. 9 illustrates a system with a vertically oriented flow body flow meter 900 located outside of pipe 402 in one or more embodiments of the present disclosure. Meter 900 includes a flow body 901 and sensor 413 in the flow body. Flow body 901 includes a top inlet 904, an internal passage 416 downstream from the inlet, and lateral outlet 408 downstream from internal passage 416. Internal passage 416 includes an axial swirler 405 downstream from inlet 904 and cylindrical section 407 downstream from the axial swirler. Flow body 901 may include elbow 417.

A diverter pipe 924 has an inlet located in pipe 402, and the diverter pipe has an outlet coupled to inlet 904 of flow body 901. Diverter pipe 924 may consist of an elbow section, a straight section, and a U-shaped section. A return pipe 926 has an inlet coupled to outlet 408 of flow body 901, and the return pipe has an outlet located in pipe 402. Return pipe 926 may consist of a first elbow section and a second elbow section of the opposite direction. Sensor 413 is located at the downstream end of flow body 901 and probes 409 and 410 extend axially into cylindrical section 407 so they are located near the center axis of the cylindrical section and away from interior wall 412 of the cylindrical section.

One advantage of system 900 is that the flow over axial swirler 405 and probes 409 and 410 is vertically downward so that the liquid phase particles flow out more readily. By modifying diverter pipe 924 and return pipe 926, system 900 may be used on substantially vertical pipes or ducts flowing upward or downward while maintaining the orientation of meter 900. It should be noted that the flow path downstream of axial swirler 405 in meters 700, 800, and 900 of FIGS. 7, 8 and 9 may have a reduced flow area by incorporating a narrowing section 618 downstream of the axial swirler as shown in meter 600 of FIG. 6.

Upward flow in a pipe or duct presents a special problem. The upward velocity can drive a wet gas stream into an opening facing downward into the flow. However, when the liquid phase particles are separated from the gas phase particles, forcing the denser liquid phase to flow upward may be difficult unless the gas velocity is very high. Several embodiments have been developed that may perform well in an upward flowing vertical pipe or duct.

Figure 10A:
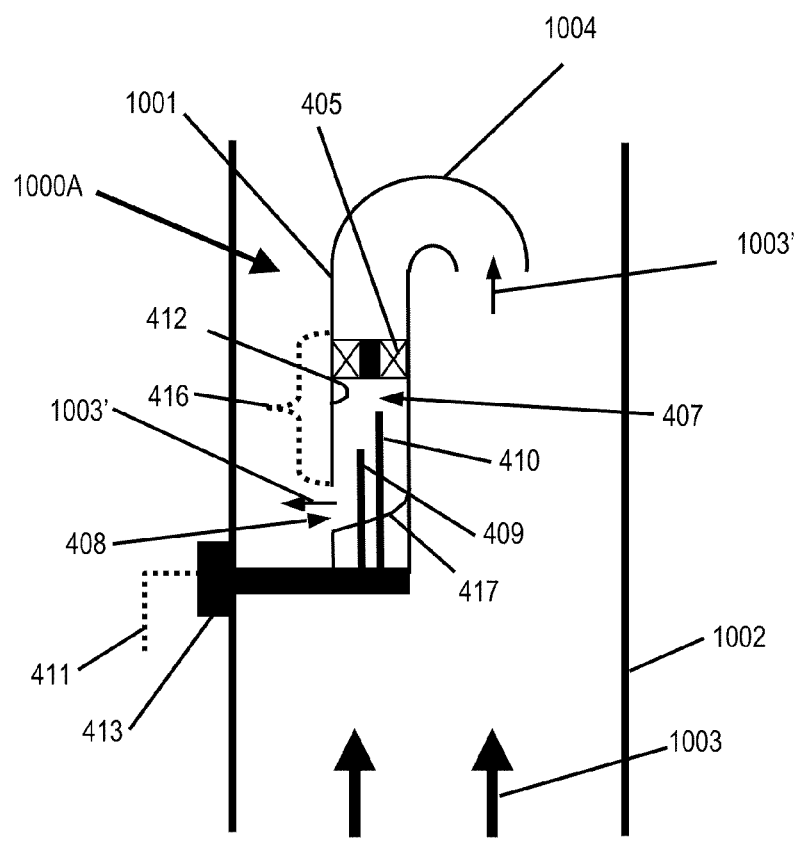
FIG. 10A illustrates a system with a flow body flow meter for an upward flow in one or more embodiments of the present disclosure.

FIG. 10A illustrates a system with a flow body flow meter 1000A for measuring an upward flow in one or more embodiments of the present disclosure. Meter 1000A is similar to meters 400 and 600 in FIGS. 4 and 6 but utilizes a U-shaped inlet 1004. Meter 1000A is aligned parallel with a flow in a pipe or duct 1002. Duct 1002 may be vertical or angled up to 45 degrees from the vertical direction. Meter 1000A includes a flow body 1001 and sensor 413 in the flow body. A wet gas stream 1003 flows through duct 1002. Stream 1003 at least intermittently carries liquid phase particles.

Using upstream and downstream to refer to the flow in flow body 1001, the flow body is tube like with U-shaped inlet 1004, internal passage 416 downstream from the inlet, and lateral outlet 408 downstream from the internal passage. Internal passage 416 includes axial swirler 405 downstream from inlet 1004, and cylindrical section 407 downstream from the axial swirler. Flow body 1001 may include elbow 417.

Now using upstream and downstream to refer to the flow in duct 1002, inlet 1004 is located downstream from outlet 408 and faces into stream 1003. Sensor 413 is located at the upstream end of flow body 1001 and probes 409 and 410 of the sensor extend axially into cylindrical section 407 so they are located near the center axis of the cylindrical section and away from interior wall 412 of the cylindrical section.

The upward flowing gas velocity drives a portion 1003' of stream 1003 into inlet 1004, through axial swirler 405, over probes 409 and 410 of sensor 413 and out through outlet 408. As similarly described above, partitions 502 of axial swirler 405 cause stream 1003' to move in a helical motion. The helical motion imparts rotational component or angular momentum to stream 1003' within axial swirler 405 and in cylindrical section 407 that forces the denser liquid phase particles to the periphery of the cylindrical section away from probes 409 and 410. The orientation of outlet 408 in FIG. 10A is shown to be directed away from inlet 1004 but can be oriented in any direction relative to the inlet.

Figure 10B:
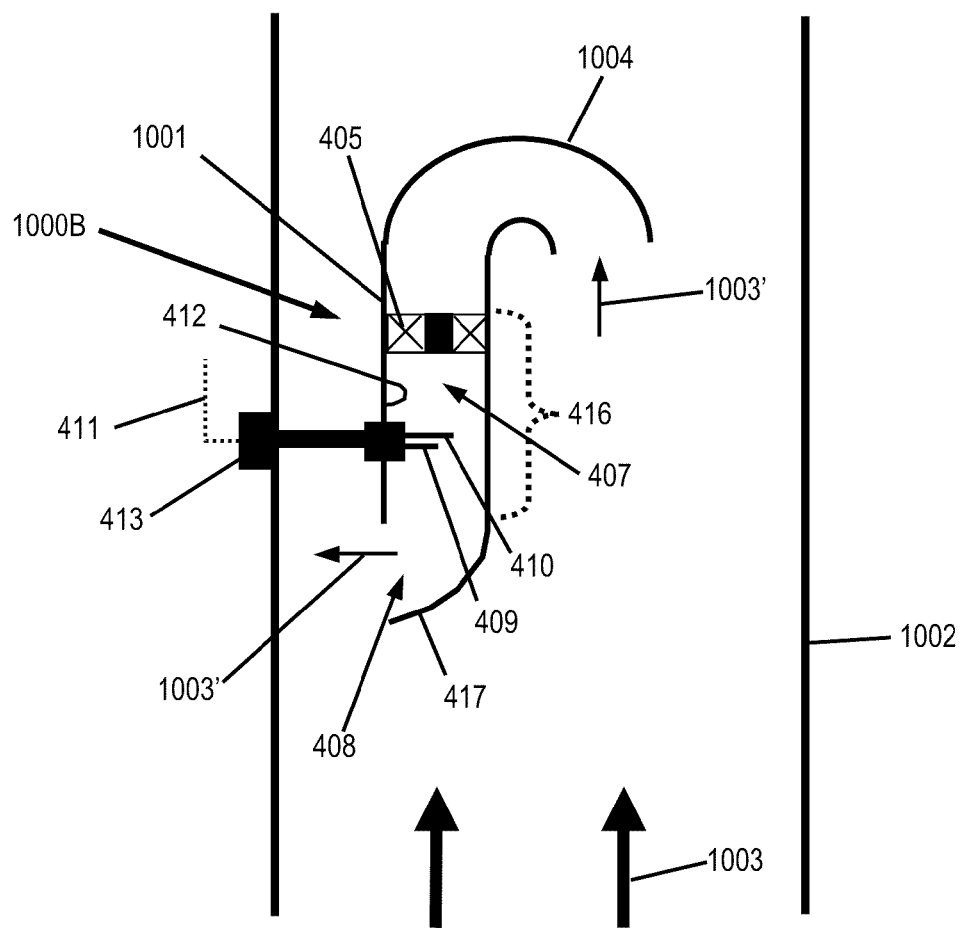
FIG. 10B illustrates a variation of the flow body flow meter of FIG. 10A in one or more embodiments of the present disclosure.

FIG. 10B illustrates a meter 1000B that is a variation of meter 1000A (FIG. 10A) in one or more embodiments of the present disclosure. Meter 1000B is similar to meter 1000A except that probes 409 and 410 of sensor 413 enter cylindrical section 407 of flow body 1001 from the side.

Figure 11A:
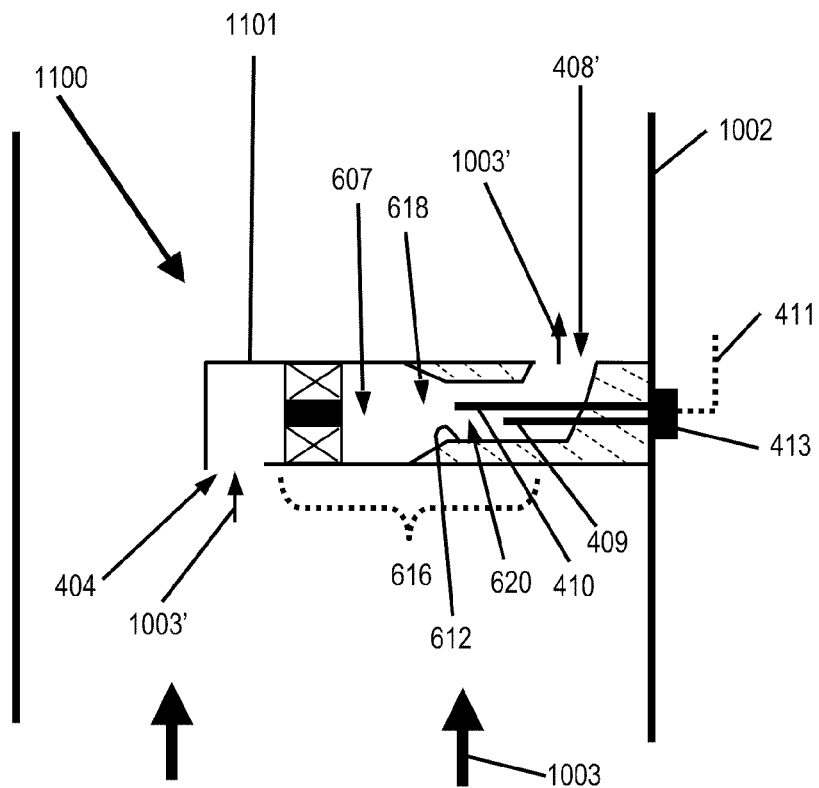
FIGS. 11A and 11C illustrate a system with a flow body flow meter that is a variation of the meter of FIG. 6 modified for an upward flow in one or more embodiments of the present disclosure.
Figure 11B:
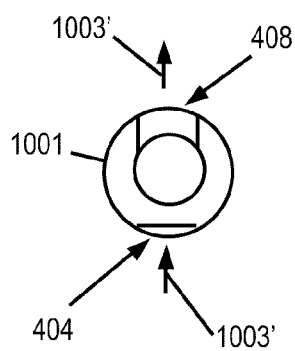
FIG. 11B illustrates one problem with applying the flow body flow meter of FIG. 6 to an upward flow in one or more embodiments of the present disclosure.
Figure 11C:
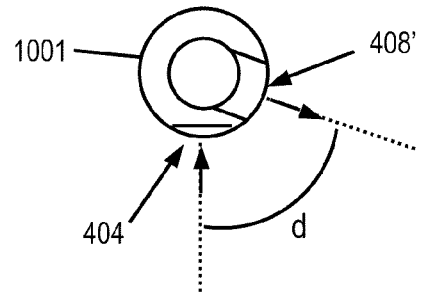

FIGS. 11A and 11C illustrate a system with a flow body flow meter 1100 for measuring an upward flow in one or more embodiments of the present disclosure. Meter 1100 is similar to meter 600 in FIG. 6 but it is modified to be applied to measure an upward flow.

FIG. 11B illustrates a problem with directly applying meter 600 to an upward flow. When inlet 404 is pointed down into stream 1003 to drive the flow into flow body 601, outlet 408 is pointed upward and the liquid phase particles may backfill cylindrical section 620 when they are unable to flow upward and exit through the outlet. To modify meter 600 for an upward flow, outlet 408 may be rotated around the center axis of flow body 601 so it is pointed to the side or downward.

Referring to FIGS. 11A and 11C, meter 1100 includes a flow body 1101 and sensor 413 in the flow body. Flow body 1101 includes lateral inlet 404, internal passage 616 downstream from the inlet, and a lateral outlet 408' downstream from the internal passage. Probes 409 and 410 of sensor 413 extend axially into narrow cylindrical section 620 of internal passage 616 so they are located near the center axis of the narrow cylindrical section and away from interior wall 612 of the narrow cylindrical section. As shown in the end on view in FIG. 11C, outlet 408' is pointed downward to allow the liquid phase particles separated from stream 1003' to exit. The downward angle "d" of outlet 1108 may vary from 120 to 15 degrees, from 90 to 20 degrees, and from 80 to 30 degrees.

In the embodiments described above, axial swirler 405 has multiple partitions 502, such as vanes or blades, arrayed around central hub 503 where the partitions are angled in either a clockwise or counterclockwise direction to impart a clockwise or counterclockwise rotation to the flow through and downstream of the axial swirler. The rotating flow with a rotational component or angular momentum allows liquid phase particles to be separate from the gas phase particles. In the systems described above, axial swirler 405 may be replaced by any device or design that produces a rotating flow within a cylindrical flow body to impart a rotational component or angular momentum to the stream passing through the flow body. For example, an array of cylindrical tubes angled at a clockwise or counterclockwise direction arrayed around a central hub will also generate an axial flow with a rotational component or angular momentum. In another example, a plenum pressurized by the flow velocity in the duct that is then directed axially into the circular interior wall of a cylinder at a clockwise or counterclockwise direction will produce a rotational flow with a rotational component or angular momentum. Other designs will be apparent to the skilled person to produce a rotating flow with a rotational component or angular momentum in a cylindrical flow body.

Figure 12:
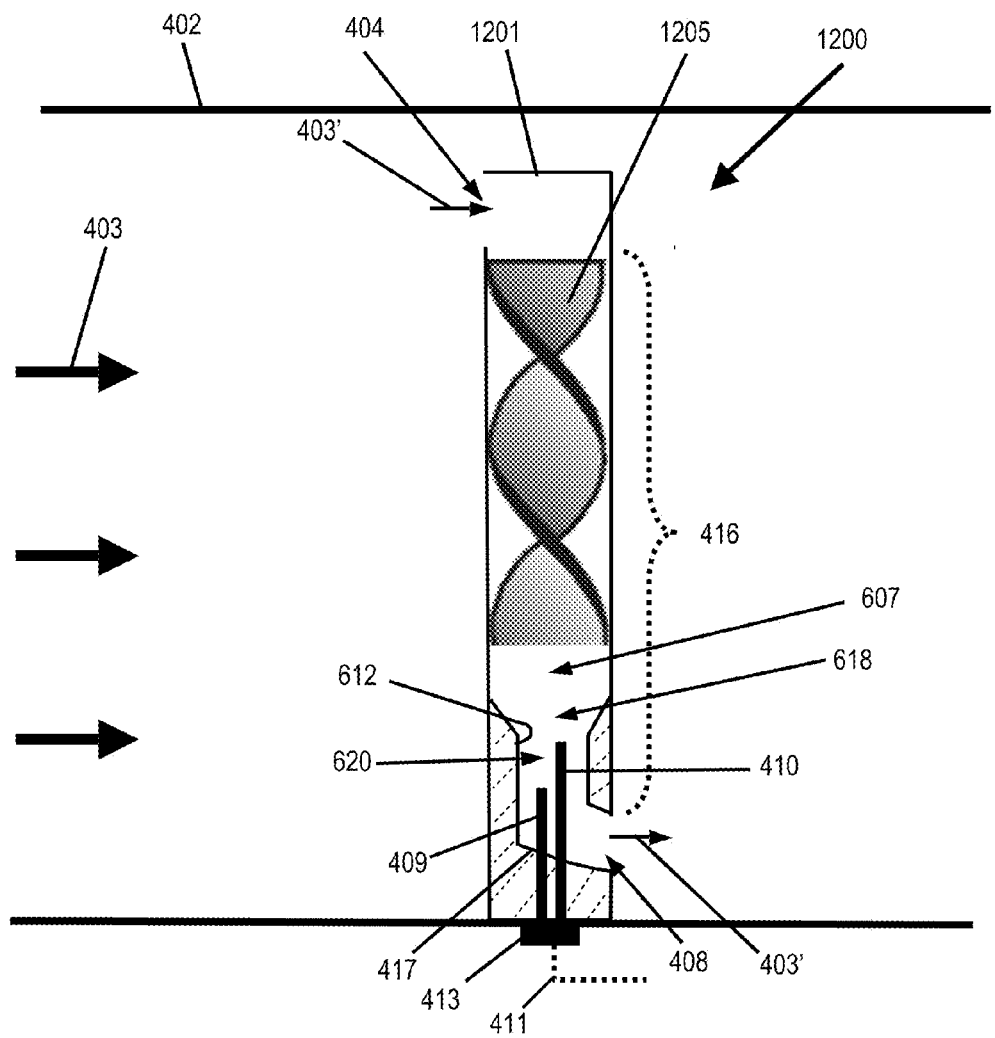
FIG. 12 illustrates a variation of the flow body flow meter of FIG. 6 with a twisted band axial swirler in one or more embodiments of the present disclosure.

FIG. 12 illustrates a system with a flow body flow meter 1200 that is a variation of meter 600 (FIG. 6) with a helical flow path in one or more embodiments of the present disclosure. Meter 1200 includes a flow body 1201 and sensor 413 in the flow body. Flow body 1201 is mounted normal to the bottom of duct 402. Flow body 1201 is tube like with lateral inlet 404, an internal passage 1216 downstream from the inlet, and lateral outlet 408 downstream from the internal passage. Internal passage 1216 includes an axial swirler 1205 downstream from inlet 404, a wide cylindrical section 607 downstream from the axial swirler, a narrowing section 618 downstream from the wide cylindrical section, and a narrow cylindrical section 620 downstream from the narrowing section. Axial swirler 1205 may be a sheet of metal twisted to form a helical guide for stream 403'. Probes 409 and 410 of sensor 413 extend axially into narrow cylindrical section 620 so they are located near the center axis of the narrow cylindrical section and away from an interior wall 612 of the narrow cylindrical section.

Stream 403' enters flow body 1201 through inlet 404 and proceeds through swirler 1205 in a helical manner. Forcing stream 403' to flow in this helical manner imparts a rotational component or angular momentum to the flow so that that centrifugal force drives the denser liquid phase particles to the periphery of the flow path and into interior wall 612 of narrow cylindrical section 620. A portion of stream 403' stripped of the liquid phase particles then flows across probes 409 and 410 and exits through outlet 408.

As similarly described above, flow body 1201 may include elbow 417 and duct 402 may be inclined as long as the flow velocity of stream 403' is sufficient to drive liquid phase particles out from flow body 1201 so they do not collect within narrow cylindrical section 620 and interfere with the operation of probes 409 and 410.

Figure 13:
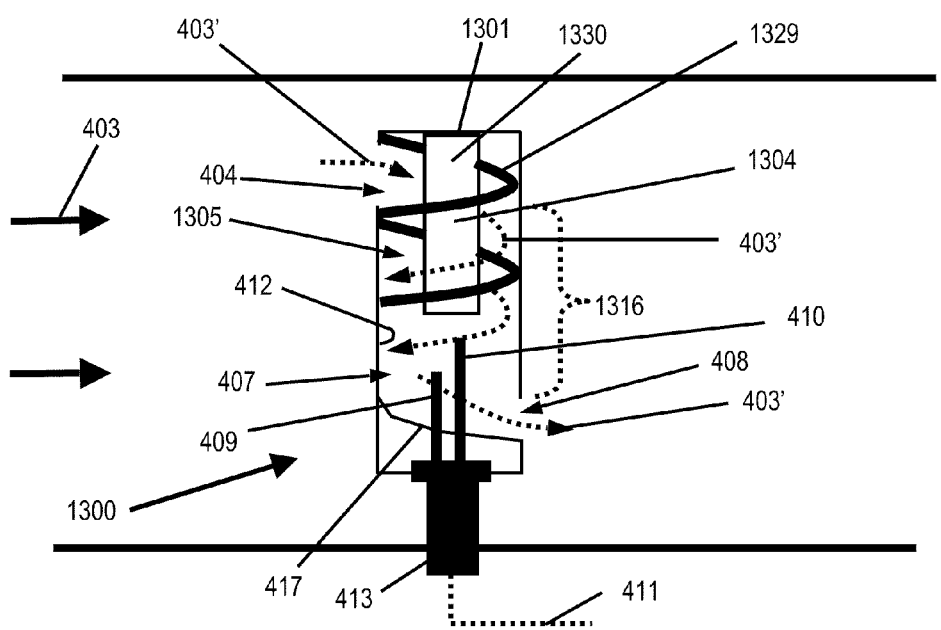
FIG. 13 illustrates a variation of the flow body flow meter of FIG. 6 with a helical channel in one or more embodiments of the present disclosure.

FIG. 13 illustrates a system with a flow body flow meter 1300 that is a variation of meter 1200 (FIG. 12) in one or more embodiments of the present disclosure. Meter 1300 includes a flow body 1301 and sensor 413 in the flow body. Flow body 1301 is mounted normal to the bottom of duct 402. Flow body 1301 is tube like with lateral inlet 404, an internal passage 1316 downstream from the inlet, and lateral outlet 408 downstream from the internal passage. Internal passage 1316 includes a helical channel 1305 downstream from inlet 404, and cylindrical section 407 downstream from the helical channel. Similar to an auger, helical channel 1305 has a flat surface 1329 that spirals around the annular space between a central hub 1330 and an interior wall 1312 of flow body 1301. Probes 409 and 410 of sensor 413 extend axially into cylindrical section 407 so they are located near center the axis of the cylindrical section and away from an interior wall 412 of the cylindrical section.

Stream 403' enters flow body 1301 through inlet 404 and proceeds through helical channel 1305 in a helical manner. Forcing stream 403' to flow in this helical manner imparts angular momentum to the flow so that that centrifugal force drives the denser liquid phase particles to the periphery of the flow path and into interior wall 412 of flow body 1301. A portion of stream 403' stripped of the liquid phase particles then flows across probes 409 and 410 and exits through outlet 408.

As similarly described above, flow body 1301 may include elbow 417 and duct 402 may be inclined as long as the flow velocity of stream 403' is sufficient to drive liquid phase particles out from flow body 1301 so they do not collect within cylindrical section 407 and interfere with the operation of probes 409 and 410. Flow body 1301 may also incorporate narrowing section 618 and narrow cylindrical section 620 of flow body 601 in FIG. 6.

Figure 14A:
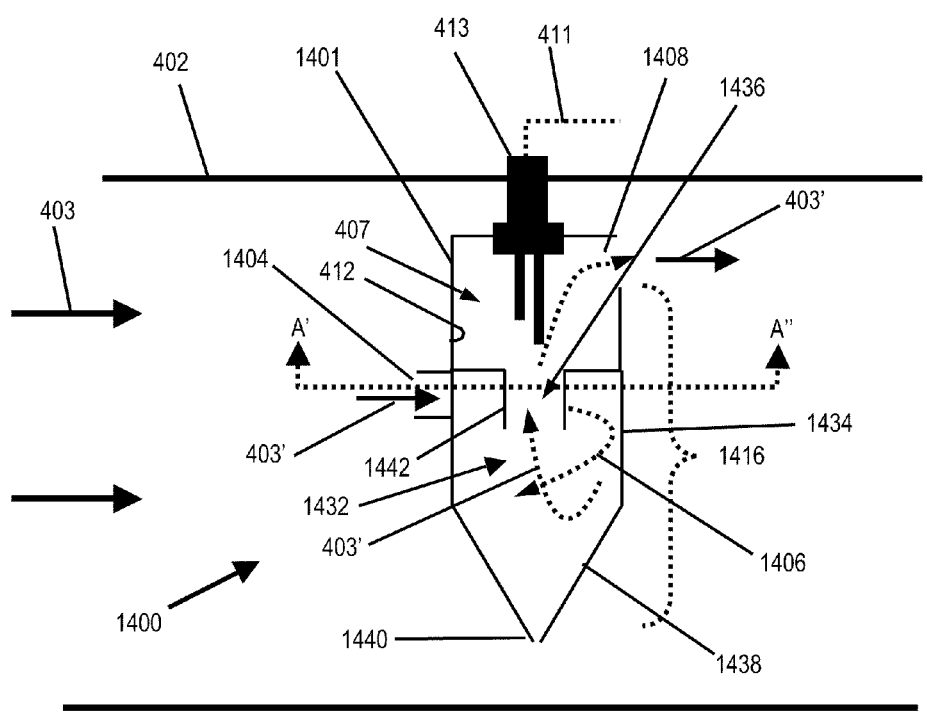
FIGS. 14A and 14B illustrate a system with a flow body flow meter having a cyclone separator in one or more embodiments of the present disclosure.

FIG. 14A illustrates a system with a flow body flow meter 1400 utilizing a cyclone separator in one or more embodiments of the present disclosure. A cyclone separator is traditionally used industrially for dust collection. See Perry's Chemical Engineers' Handbook, $6^{th}$ edition, McGraw-Hill, NY, 1984, p. 20-82. System 1400 includes a flow body 1401 and sensor 413 in the flow body. Flow body 1401 is mounted normal to the top of duct 402.

Flow body 1401 is tube like with a conical end. Flow body 1401 includes a lateral inlet 1404, an internal passage 1416 downstream from the inlet, and a lateral outlet 1408. Internal passage 1416 comprises a cyclone separator section 1432 downstream from inlet 1404, and cylindrical section 407 downstream from the cyclone separator section. Inlet 1404 is off center from cyclone separator section 1432. Cyclone separator section 1432 includes a cylindrical section 1434 having a top outlet 1436 to cylindrical section 407, and a conical section 1438 with a bottom outlet 1440 to pipe 402. Probes 409 and 410 of sensor 413 extend axially into cylindrical section 407 so they are located near the center axis of cylindrical section 407 and away from interior wall 412 of cylindrical section 407.

Figure 14B:
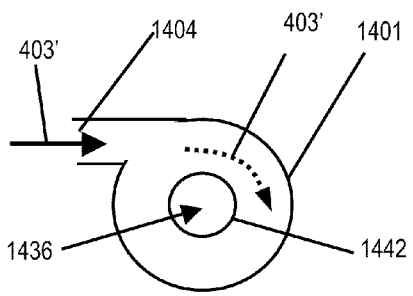

For clarity, FIG. 14B illustrates a cross sectional view at line A'A" of FIG. 14A in one or more embodiments of the present disclosure. Stream 403' entering inlet 1404 flows around a central cylinder 1442 in cylindrical section 1434 and into conical section 1438. The rotational component or angular momentum of stream 403' drives the denser liquid phase particles into the interior walls of cyclone separator section 1432 and the liquid phase particles exit through bottom outlet 1440 into pipe 402. Stream 403' without liquid phase particles proceeds up through top outlet 1436 into cylindrical section 407 and exits through outlet 1408 into pipe 402. A portion of stream 403' that is substantially free of the liquid phase particles flows over probes 409 and 410.

As similarly described above, duct 402 may be inclined as long as the flow velocity of stream 403' is sufficient to drive liquid phase particles out from flow body 1401 so they do not collect within cylindrical section 407 and interfere with the operation of probes 409 and 410.

Figure 15A:
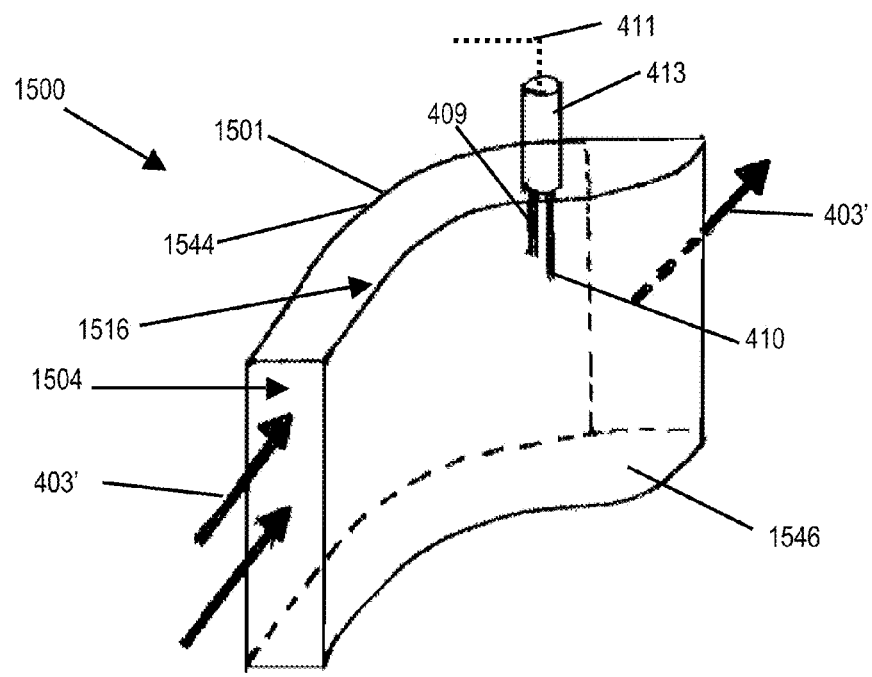
FIGS. 15A and 15B illustrate a system with a flow body flow meter having a half annulus flow channel in one or more embodiments of the present disclosure.
Figure 15B:
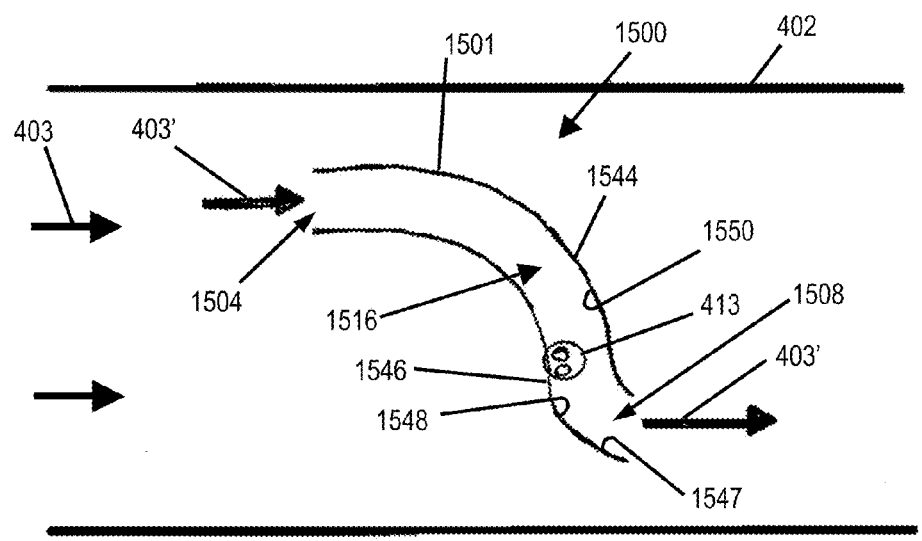

FIGS. 15A and 15B illustrate a system with a flow body flow meter 1500 utilizing an S-bend in the flow path in one or more embodiments of the present disclosure. Meter 1500 includes a flow body 1501 and sensor 413 in the flow body. Flow body 1501 is located in duct 402. Flow body 1501 is a rectangular pipe having an inlet 1504, an internal passage 1516 downstream from the inlet, and an outlet 1508 downstream from the internal passage. Internal passage 1516 has an S-shape formed by a clockwise bend 1544 followed by a counterclockwise bend 1546. Sensor 413 is located at or just downstream of bend 1546 and probes 409 and 410 extend laterally into the rectangular pipe so they are located near a wall 1548 that is on the inside of the bend and away from a wall 1550 that is on the outside of the bend. Note that the inside and the outside of a bend are defined relative to the direction of the bend as it relates to the gaseous flow going around the bend.

Stream 403' enters flow body 1501 at inlet 1504 and as the stream passes through the curve in internal passage 1516, the induced angular momentum in the stream drives the denser liquid phase particles to wall 1550 of bend 1546. Sensor 413 is placed in a portion of the stream away from wall 1550 where the stream is substantially free of liquid phase particles. Embodiment shown in FIGS. 15A and 15B would work best if the rectangular duct shown in FIG. 15A is oriented vertically as shown thus allowing the dense liquid phase to impact wall 1544 and run to the bottom 1547 and out outlet 1508. Other orientations may also perform well especially at high gas velocities.

As similarly described above, duct 402 may be inclined as long as the flow velocity of stream 403' is sufficient to drive liquid phase particles out from flow body 1501 so they do not collect within bend 1546 and interfere with the operation of probes 409 and 410.

Figure 16A:
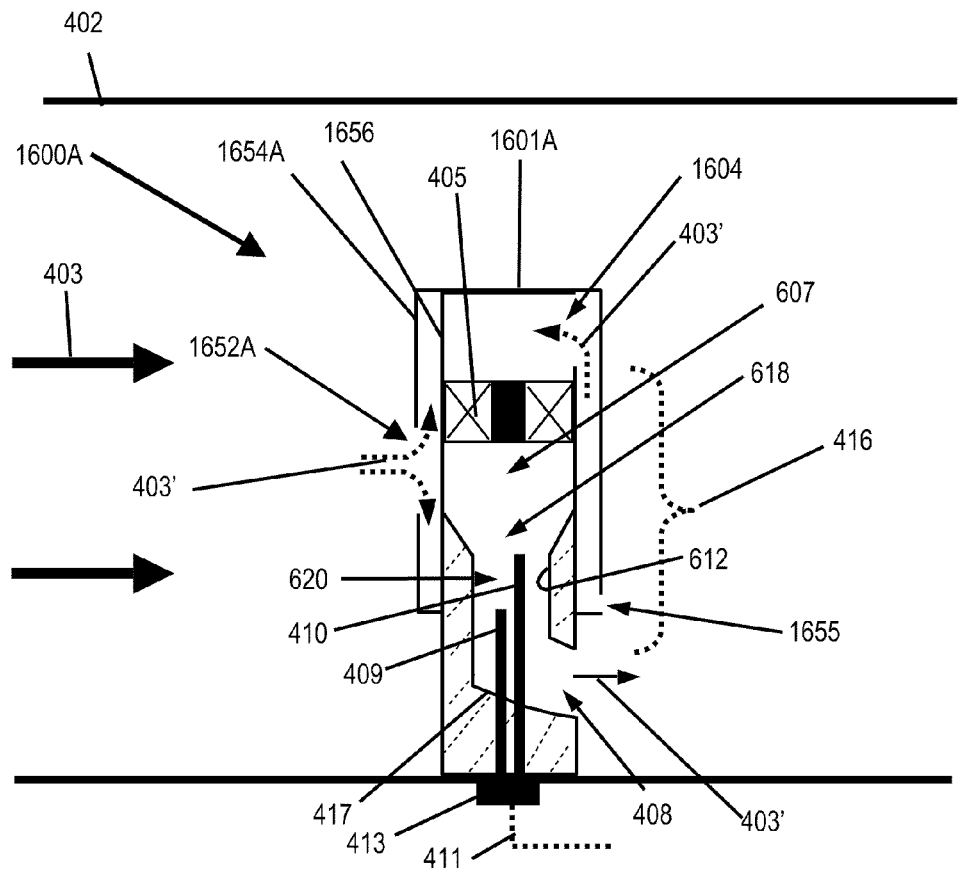
FIG. 16A illustrates a variation of the flow body flow meter of FIG. 6 with a pre-filter in one or more embodiments of the present disclosure.

FIG. 16A illustrates a system with a flow body flow meter 1600A that is a variation of system 600 (FIG. 6) with a pre-filter in one or more embodiments of the present disclosure. System 1600A includes a flow body 1601A and sensor 413 in the flow body. Flow body 1601A is mounted normal to the bottom of duct 402. Flow body 1601 is similar to flow body 601 in FIG. 6 combined with an additional outer cylinder 1654A.

Flow body 1601 includes outer cylinder 1654A around an inner cylinder 1656. Outer cylinder 1654A defines a lateral inlet 1652A centered along the long axis of the outer cylinder, and a lower outlet 1655 to pipe 402. Outer cylinder 1654A and inner cylinder 1656 are interconnected by an opening 1604. Inlet 1652A and opening 1604 are located at opposite sides of flow body 1601. Stream 403' enters inlet 1652A and passes through the annular space between cylinders 1654A and 1656 to reach opening 1604. Similar to flow body 601, inner cylinder 1656 includes internal passage 616 downstream from opening 1604, and lateral outlet 408 downstream from the internal passage. Internal passage 616 includes axial swirler 405 downstream from inlet 404, a wide cylindrical section 607 downstream from the axial swirler, a narrowing section 618 downstream from the wide cylindrical section, and a narrow cylindrical section 620 downstream from the narrowing section. Probes 409 and 410 of sensor 413 extend axially into narrow cylindrical section 620 so they are located near the center axis of the narrow cylindrical section and away from interior wall 612 of the narrow cylindrical section.

Outer cylinder 1654A collects some of the liquid phase particles that impact inner cylinder 1656 after inlet 1652A, and these liquid phase particles drain down the annular space and out through outlet 1655 into pipe 402. Meter 1600A advantageously removes some of the liquid phase particles through the impact of the liquid phase particles on inner cylinder 1656 as stream 403' enters inlet 1652A and thus keeps some of the liquid phase particles from reaching the inner cylinder.

As similarly described above, duct 402 may be inclined as long as the flow velocity of stream 403' is sufficient to drive liquid phase particles out from flow body 1601A so they do not collect within narrow cylindrical section 620 and interfere with the operation of probes 409 and 410.

Figure 16B:
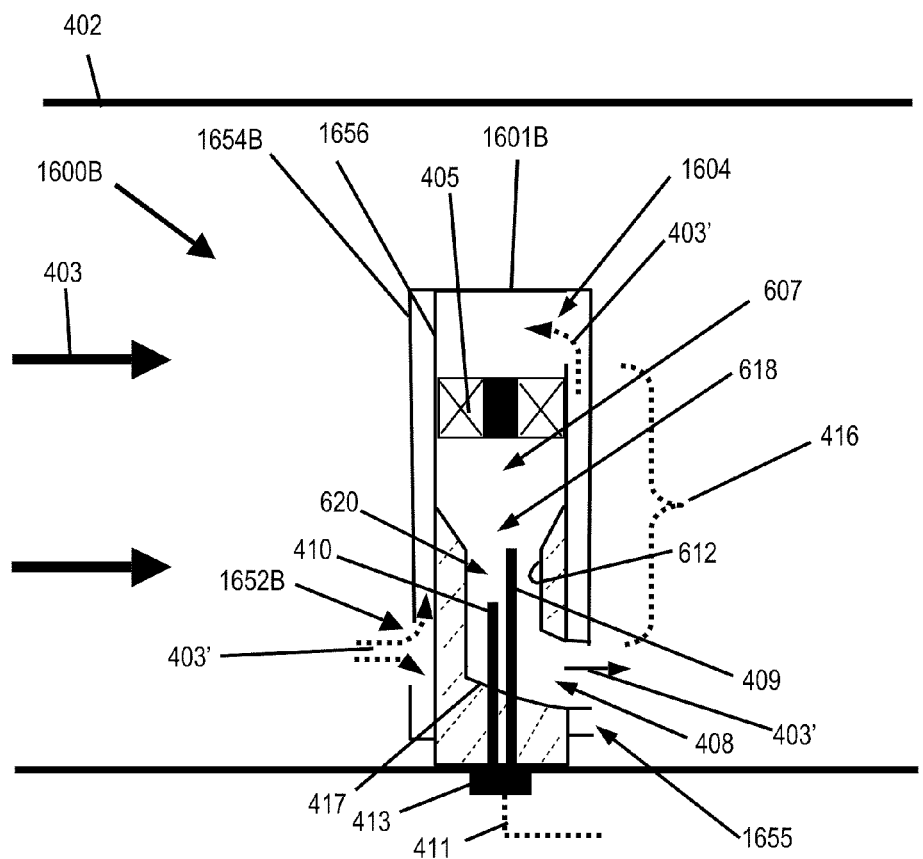
FIG. 16B illustrates a variation of the flow body flow meter of FIG. 16A with opposing inlet and outlet in one or more embodiments of the present disclosure.

FIG. 16B illustrates a meter 1600B that is a variation of meter 1600A (FIG. 16A) in one or more embodiments of the present disclosure. In meter 1600B, an outer cylinder 1654B defines a lateral inlet 1652B that is concentrically opposed to outlet 408 of inner cylinder 1656 so that meter 1600B is measuring the flow generated by the velocity of a narrow flow region in pipe 402. Where the flow velocity varies widely over distance, having inlet 1652B and outlet 408 in the same flow regime gives a flow reading that is representative of the inlet and the outlet positions.

As similarly described above, duct 402 may be inclined as long as the flow velocity of stream 403' is sufficient to drive liquid phase particles out from flow body 1601B so they do not collect within narrow cylindrical section 620 and interfere with the operation of probes 409 and 410.

In one or more embodiments of the present disclosure, a turbine wheel or a paddle wheel device driven by a motor or another rotating driver is used to impart a rotational component or angular momentum to the flow within the flow body. Such a system may impart higher rotational component or angular momentum to the flow through the flow body and more efficiently separate liquid phase particles from the gas phase particles. The paddle wheel or turbine wheel would be located in a similar position as the swirler in many of the embodiment shown herein. As the gaseous flow passes through the rotating wheel, the wheel imparts a rotational component or angular momentum to the gaseous flow and as it flows out of the rotating device, the angular momentum drives the denser liquid phase particles to the wall by centrifugal force, allowing the gaseous component free of liquid particles pass over the sensor. The means for driving the rotating wheel could be an internal motor or an external motor, powered electrically, by air flow or other means.

Figure 17:
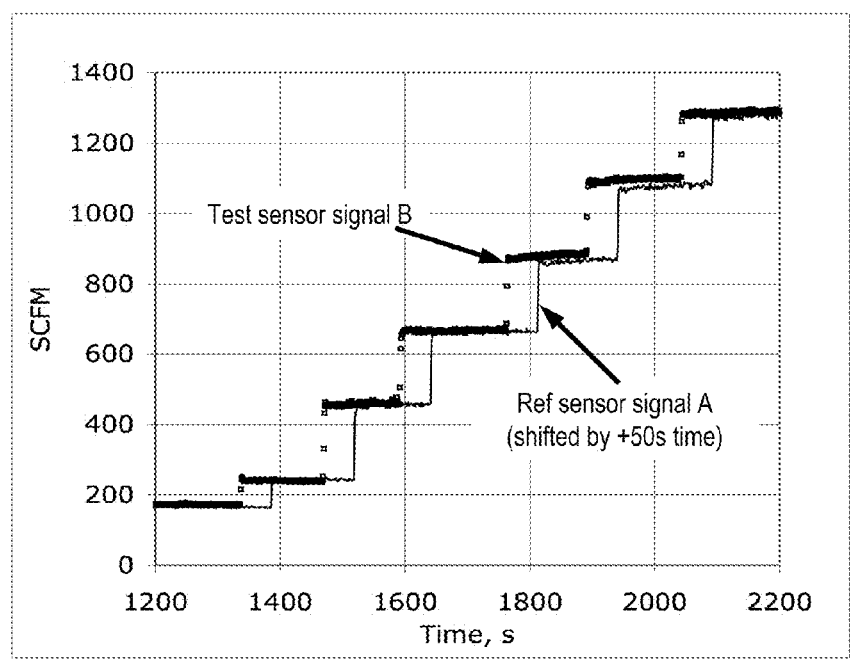
FIG. 17 is a chart showing measurements of the flow body flow meter of FIG. 6 in the setup of FIG. 2 in one or more embodiments of the present disclosure.

FIG. 17 illustrates the performance of meter 600 of FIG. 6 in one or more embodiments of the present disclosure. Meter 600 was place in the setup of FIG. 2 where a water mist injector 204 was placed upstream of the meter. In addition, a reference flow meter was located upstream of the water mist injector so that it would measure the air flow rate independent of the injection of the water mist. Meter 600 was calibrated by flowing dry air through pipe 202 at a known flow rate and measuring the response of a thermal anemometer sensor 413 at a series of flow rates from 100 to 1300 standard cubic feet per minute (SCFM). The flow was then varied from 180 to 1300 SCFM while the water mist was injected upstream of meter 600.

FIG. 17 shows the readings of both the reference flow meter ("Ref sensor signal A") upstream of water mist injector 204 and thermal anemometer sensor 413 in meter 600 ("Test sensor signal B"). The reference sensor signal A was shifted by +50 seconds in time to allow the signals to be differentiated. The data show that meter 600 completely removes all liquid phase particles, thereby allowing an accurate and stable measurement of the air flow rate. It should also be noted that the flow through meter 600 is a well defined function of the flow in the pipe or duct. The data of FIG. 17 shows that after calibration of thermal anemometer sensor 413 in meter 600, the thermal anemometer sensor measures the gaseous flow in the pipe very accurately.

It is clear from the many above embodiments that the design of the flow body can take a number of different shapes. In many of the examples, the flow is down through the flow body with the denser liquid phase particles flowing out the bottom. This is easier to achieve since trying to drive the denser liquid phase particles up through a flow body would require a high gas velocity to push the liquid against gravity. However, when high gas velocity is present, the various embodiments described above may be used when the flow is up through the flow body with the denser liquid phase particles flowing out through the top.

While many of the above embodiments show the flow body flow meter inserted into the pipe or conduit orthogonally from the bottom or the top, it is possible to mount the flow body at other angles. For a horizontal pipe or duct and looking into the along the direction of flow, the flow body flow meter can be inserted from the bottom or at the 6 o'clock position, or from the top or at the 12 o'clock position. The flow body flow meters shown in FIGS. 4 and 6 have been shown to operate from the 6 o'clock to the 3 o'clock positions at low gas velocities and even at orientations up to the 12 o'clock position at high gas velocities. While many of the figures presented herein show the flow body flow meter as a probe inside a pipe of limited diameter, the flow body flow meter may be attached to a long extension tube or rod and inserted in large diameter pipes, ducts, vent stacks, or even in a open flow streams such as wind or the air flowing past a moving vehicle.

Figure 18:
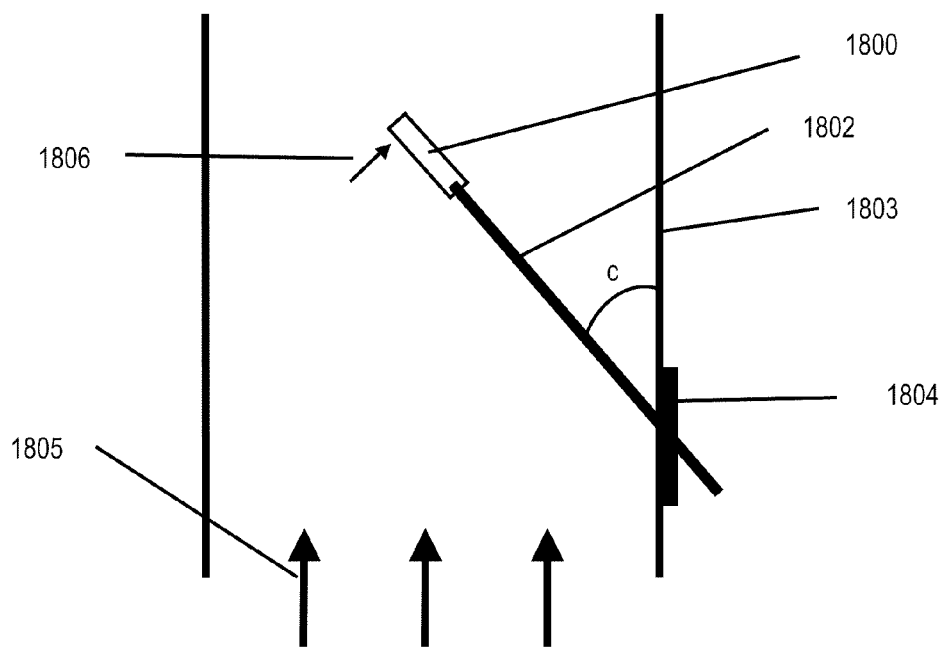
FIG. 18 illustrates a flow body flow meter attached to an extension rod inserted into a large diameter pipe or duct through a flange in one or more embodiments of the present disclosure.

FIG. 18 shows a system with a flow body flow meter 1800 attached to an extension rod 1802 and inserted into a vertical pipe, duct, or stack 1803 through a flange 1804 in one or more embodiments of the present disclosure. A wet gas stream 1805 is flowing vertically upward through duct 1803. Stream 1805 at least intermittently carries liquid phase particles. Meter 1800 may be any of the flow body flow meters described in the present disclosure. Meter 1800 has an inlet 1806 pointed substantially into stream 1805. As described in FIG. 11, the outlet may be rotated to point to the side or slightly downward to allow the collected liquid phase particles to more easily drain from meter 1800. Meter 1800 can be inserted into duct 1803 horizontally with angle "c" equal to 90 degrees relative to the vertical direction. Alternatively, meter 1800 can be inserted in an upward direction with angle c less than 90 degrees relative to the vertical direction. Using an angle c less then 90 degrees, for example 45 degrees, would allow the liquid phase particles to flow out of the outlet of designs such flow meter 400, 600, and 700.

Very large ducts and pipes can have very non-uniform flow profiles so that measurement of the flow velocity at one point does not give a true indication of the average or total flow in the pipe. In these cases the flow velocity should be measured at several points in the pipe or duct and these readings averaged to obtain the total pipe flow.

Figure 19:
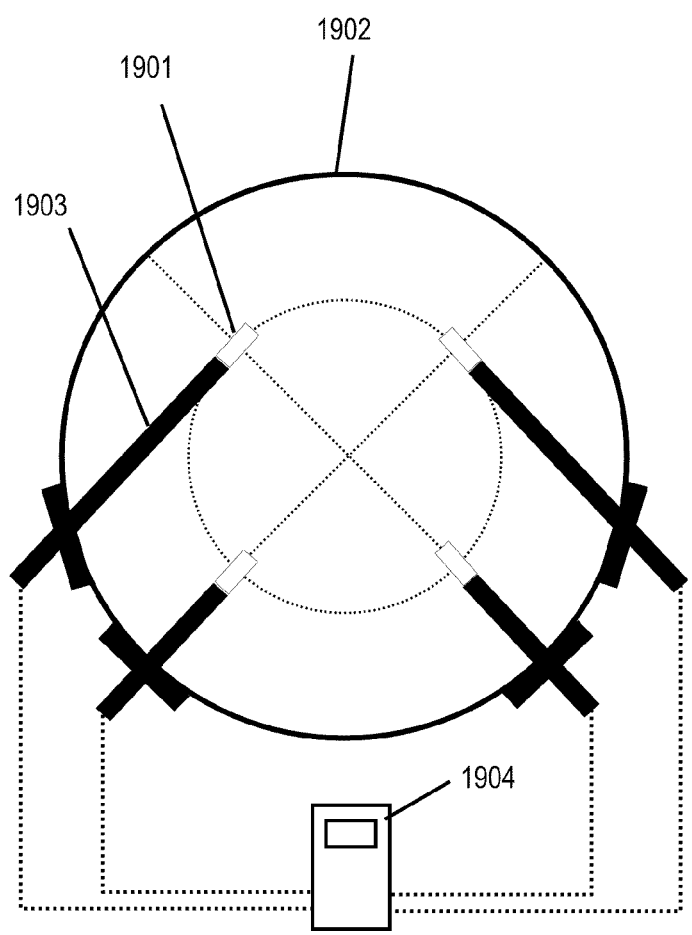
FIG. 19 shows an array of flow body flow meters for a large horizontal duct in one or more embodiments of the present disclosure.

FIG. 19 shows an array of flow body flow meters 1901 (only one is labeled) for a large horizontal duct 1902 in one or more embodiments of the present disclosure. Probes are inserted into duct 1902, each probe consisting of an extension rod 1903 and a meter 1901 at the end of the rod. Meter 1901 may be any of the flow body flow meters described in the present disclosure. By placing flow body flow meters 1901 at selected locations within duct 1902, an average flow velocity can be measured by an electrical controller circuit 1904.

Figure 20A:
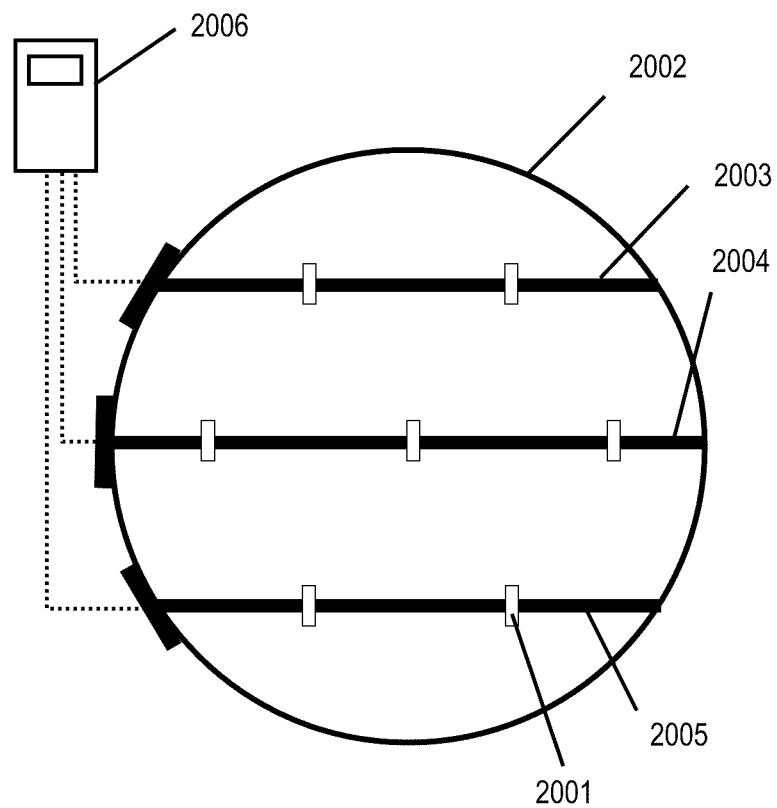
FIG. 20A shows an array of flow body flow meters for a large horizontal duct in one or more embodiments of the present disclosure.

FIG. 20A shows an array of flow body flow meters 2001 (only one is labeled) for a large horizontal duct 2002 in one or more embodiments of the present disclosure. Three support rods 2003, 2004, and 2005 are inserted into duct 2002. Mounted to support rods 2003, 2004, and 2005 are meters 2001. This array of meters 2001 may contain two or more flow body flow meters and can be suspended from one or more support rods that enter from either one wall of the duct or traverse the entire duct. Similar designs are possible for vertical flow using embodiments of the flow body flow meters for vertical pipe applications.

Figure 20B:
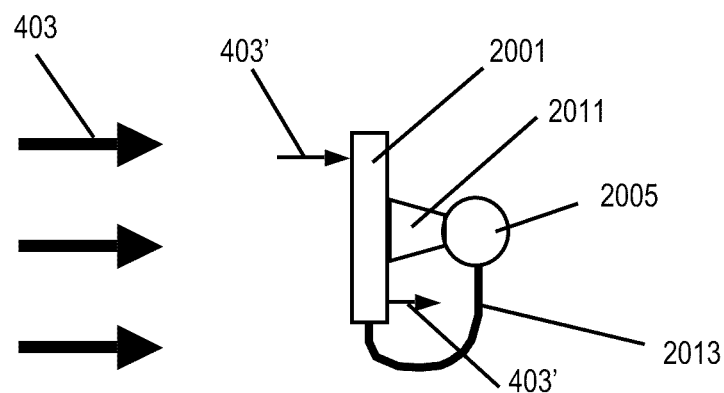
FIG. 20B shows the mounting of a flow body flow meter to a support rod of FIG. 20A in one or more embodiments of the present disclosure.

FIG. 20B shows the mounting of meter 2001 in one or more embodiments of the present disclosure. Meter 2001 is suspended by a bracket 2011 from a support rod (e.g., support rod 2005). Meter 2001 may be any of the flow body flow meters described in the present disclosure. The flow sensor signals from flow body flow meters 2001 may be routed through leads or pipe 2013 to support rod 2005 where it runs to the outside of the duct and to an electronics unit 2006 (FIG. 21A) where the signals are processed.

The descriptions above describe a flow body flow meter with a flow sensor, such as a thermal anemometer sensor in a flow body that separates out liquid phase particles and allows only gas or vapor phase particles to pass over the flow sensor. The operation of the flow body is not dependent on the type of flow meter or the configuration of the flow meter described in the specific implementations or figures herein. The thermal anemometer sensor may be a single probe unit with both temperature measurement and heated region in the same probe or even a single temperature sensor that periodically oscillates between temperature measurement and heated sensor. The thermal anemometer sensor can be operated in a constant power mode, a constant current mode, a constant temperature difference mode or any of the control modes as described in U.S. Pat. No. 7,418,878, which is incorporated herein by reference.

The above described embodiments of the flow body flow meter may be utilized in a flow switch for a wet gas stream where the sensor signal is used to determine the state of the stream, either high or low, on or off, above a limit or below a limit. A flow switch application may make particular use of the embodiments of the present disclosure since the presence of the liquid phase particles could cause a conventional flow meter to give periodic high or low readings resulting in activating the switch function when the gaseous component of interest has not varied significantly.

The embodiments herein incorporate flow bodies with internal passages and components that may trap dust or debris that may be entrained in the gaseous flow stream. These solid materials may deposit and plug these internal passages leading to changes in the flow calibration or poor separation of the liquid droplets from the gaseous flow. To reduce the effect of such deposits, an air purge system, such as air purge system 488 in FIG. 4A, can be added to the flow body that would force a high velocity of clean air through the flow body and effectively blow solid deposits out of the device. The air purge can enter the device from the region near the inlet, from the device near the outlet, or can be channeled into the region just downstream of the axial swirler where the purge flow would flow toward both the inlet and the outlet. The purge stream can be other gases such as steam, nitrogen, or other gases. An alternative purge method is to use a liquid flow such as water or some solvent that would not only blow out solid deposits but could also dissolve any soluble deposits. The purge may be repeated periodically, such as every 15 minutes or every hour depending on the level or rate of plugging. The purge may be for varying lengths of time again depending on the level or rate of plugging. During the purge cycle, the flow sensor output signal may be "latched" or held at its value just prior to the purge cycle to eliminate an erroneous sign from the flow meter and the output signal released when it has returned to a normal steady value.

Various other adaptations and combinations of features of the embodiments disclosed are within the scope of the invention. Numerous embodiments are encompassed by the following claims.

What is claimed is:

1. A flow measurement system for a duct, comprising:
 a flow body flow meter receiving a wet gas stream from a larger wet gas stream in the duct, the flow body flow meter comprising:
  a sensor having one or more probes in a flow body, wherein the one or more probes are in a path of the wet gas stream;
  the flow body, comprising:
   a lateral inlet about a first end of the flow body, the inlet receiving the wet gas;
   an internal passage, comprising:
    an axial swirler downstream from the inlet, the axial swirler providing a rotational path imparting angular momentum to the wet gas stream to induce a rotating flow; and
    a cylindrical section downstream from the axial swirler, one or more tips of the one or more probes being located near a center axis of the cylindrical section and away from an interior wall of the cylindrical section; and
   a lateral outlet about a second end of the flow body, the outlet returning the wet gas stream from the flow body back into the duct, wherein the flow body is mounted at the first or the second end to an inner wall of the duct.

2. The system of claim 1, wherein the wet gas stream at least intermittently carries liquid phase particles, and the angular momentum of the wet gas stream forces the denser liquid phase particles to the periphery, and the one or more probes of the sensor are located in a part of the flow body that is free of any liquid phase particles.

3. The system of claim 1, further comprising the duct, wherein the inlet points substantially into a flow direction of the larger wet gas stream.

4. The system of claim 3, wherein the outlet points substantially away from the flow direction, and the flow body is mounted normal to the inner wall at a point along a duct circumference so the inlet is higher than the outlet.

5. The system of claim 3, wherein the duct is vertical, the flow body is mounted normal to the inner wall, and the outlet points substantially away from the flow direction.

6. The system of claim 1, wherein the axial swirler is selected from the group consisting of angled partitions extending from a central hub, a twisted band in the flow body, and a helical channel comprising a surface that spirals around an annular space between a central hub and an inner wall of the flow body.

7. The system of claim 1, wherein the internal passage further comprises a narrowing section downstream from the axial swirler and upstream from the cylindrical section.

8. The system of claim 1, wherein:
 the flow body comprises an outer cylinder around an inner cylinder, the outer cylinder defining the inlet, the inner cylinder defining the internal passage and the outlet, and the outer cylinder and the inner cylinder being connected by an opening; and
 the internal passage further comprising a narrowing section downstream from the axial swirler and upstream from cylindrical section.

9. The system of claim 1, further comprising a purge system periodically injecting a purge stream into the flow body at one of the inlet, upstream of the axial swirler, downstream of the axial swirler, or at the outlet.

10. The system of claim 1, further comprising:
 another flow body flow meter in the duct, the other flow body flow meter comprising another sensor; and
 a support rod inserted at least partially into the duct, the support rod supporting the flow body flow meter and the other flow body flow meter.

11. The system of claim 10, further comprising an electronic controller coupled to receive signals from the sensor and the other sensor to obtain an average property within the duct.

12. The system of claim 1, wherein the sensor is a thermal anemometer sensor.

13. A flow body flow meter to be fitted to a duct, the flow body flow meter measuring a wet gas stream that at least intermittently carries liquid phase particles, the flow body flow meter comprising:
 a flow body, comprising:
  a lateral inlet about a first end of the flow body, the lateral inlet pointing substantially into a flow direction of the wet gas stream in the duct;
  an internal passage downstream from the lateral inlet, the internal passage comprising:
   an axial swirler imparting angular momentum to the wet gas stream to induce a rotating flow;
   a narrowing section downstream from the axial swirler;
   a cylindrical section downstream from the narrowing section; and
   an elbow downstream from the cylindrical section; and
  a lateral outlet downstream from the elbow and about a second end of the flow body, the lateral outlet pointing substantially away from the flow direction of the duct, wherein the flow body is mounted at the first or the second end normal to an inner wall of the duct; and
 a sensor comprising one or more probes extending axially from the first or the second end into the cylindrical section, wherein one or more tips of the one or more probes are located near a center axis of the cylindrical section and away from an interior wall of the cylindrical section.

* * * * *